US012689636B2

(12) United States Patent
Raziel et al.

(10) Patent No.: US 12,689,636 B2
(45) Date of Patent: *\*Jul. 21, 2026**

(54) TECHNIQUES FOR INCIDENT RESPONSE AND STATIC ANALYSIS REPRESENTATION IN COMPUTING ENVIRONMENTS

(71) Applicant: Wiz, Inc., New York, NY (US)

(72) Inventors: Alma Raziel, Tel Aviv-Jaffa (IL);
George Pisha, Giv'atayim (IL);
Michael Aminov, Givatayim (IL); **Avi
Tal Lichtenstein, Tel Aviv (IL); Tal
Gilady, Brooklyn, NY (US); Amitai
Cohen**, Kfar Saba (IL)

(73) Assignee: Wiz, Inc., New York, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/943,284

(22) Filed: Nov. 11, 2024

(65) Prior Publication Data

US 2025/0379875 A1     Dec. 11, 2025

Related U.S. Application Data

(63) Continuation of application No. 18/737,481, filed on Jun. 7, 2024, now Pat. No. 12,166,778.

(51) Int. Cl.
H04L 9/40 (2022.01)
(52) U.S. Cl.
CPC ...... H04L 63/1416 (2013.01); H04L 63/1425 (2013.01)
(58) Field of Classification Search
CPC ............. H04L 63/1416; H04L 63/1425; H04L 63/1433; G06F 21/577

USPC .......................................................... 726/23
See application file for complete search history.

(56) References Cited

U.S. PATENT DOCUMENTS

| | | | | |
|---|---|---|---|---|
| 9,787,705 | B1 * | 10/2017 | Love .................... | G06F 16/9024 |
| 10,291,653 | B2 * | 5/2019 | Senanayake ........ | H04L 63/1433 |
| 10,567,415 | B2 * | 2/2020 | Doppke ................ | G06F 21/577 |
| 10,749,890 | B1 * | 8/2020 | Aloisio ................. | H04L 63/302 |
| 11,575,693 | B1 * | 2/2023 | Muddu ................. | G06F 16/444 |
| 2016/0164894 | A1 * | 6/2016 | Zeitlin ................ | H04L 63/1416 |
| | | | | 726/23 |
| 2018/0367548 | A1 * | 12/2018 | Stokes, III .......... | H04L 63/1416 |

(Continued)

OTHER PUBLICATIONS

First Office Action for 202510564971.7, dated Feb. 25, 2026. China National Intellectual Property Administration, Beijing, China.

*Primary Examiner* — Badri Narayanan Champakesan
(74) *Attorney, Agent, or Firm* — M&B IP Analysts, LLC

(57) ABSTRACT

A system and method for detecting an attack path in a computing environment is presented. The method includes: detecting a forensic artifact in a computing environment, the forensic artifact including an identifier of a resource deployed in the computing environment; inspecting the resource for a cybersecurity object, the cybersecurity object indicating a cybersecurity issue; generating a representation of: the detected forensic artifact, the resource, and the cybersecurity object, in a security database, wherein the security database includes a representation of the computing environment; generating a potential lateral movement path between the resource and another resource; and generating a visualization based on the potential lateral movement, the forensic artifact, and the cybersecurity object.

17 Claims, 7 Drawing Sheets

(56) References Cited

U.S. PATENT DOCUMENTS

| | | | | |
|---|---|---|---|---|
| 2021/0243208 A1* | 8/2021 | Rubin | .................... | G06F 21/552 |
| 2021/0409439 A1* | 12/2021 | Engelberg | ........... | H04L 63/1416 |
| 2022/0345483 A1* | 10/2022 | Shua | ..................... | H04L 9/0825 |
| 2022/0368722 A1* | 11/2022 | Ben-Yosef | .............. | G06F 17/18 |
| 2022/0385678 A1* | 12/2022 | Bobak | .................... | H04L 41/22 |
| 2023/0275909 A1* | 8/2023 | Shivamoggi | ........ | H04L 63/1441 |
| | | | | 726/23 |
| 2023/0379356 A1* | 11/2023 | Busany | .............. | H04L 63/1425 |
| 2025/0039228 A1* | 1/2025 | Crabtree | ............. | H04L 63/1425 |

* cited by examiner

START

S310

INSPECT A RESOURCE IN A COMPUTING ENVIRONMENT

S320

DETECT AN ARTIFACT AS A RESULT OF INSPECTION

S330

GENERATE A FORENSIC FINDING

S340

INITIATE REMEDIATION ACTION BASED ON THE FORENSIC FINDING

START

S410

DETECT A RESOURCE IN A COMPUTING
ENVIRONMENT

S420

GENERATE INSPECTABLE DISK FROM THE
RESOURCE

S430

INSPECT THE INSPECTABLE DISK FOR A
CYBERSECURITY OBJECT

S440

INITIATE REMEDIATION ACTION BASED ON
CYBERSECURITY ISSUE

START

S510

SELECT AN ENTITY REPRESENTATION FROM
A SECURITY DATABASE

S520

DETERMINE A POTENTIAL LATERAL
MOVEMENT PATH

S530

INITIATE REMEDIATION ACTION BASED ON
POTENTIAL LATERAL MOVEMENT

START

S610

GENERATE A FORENSIC FINDING

S620

DETECT A POTENTIAL LATERAL MOVEMENT PATH

S630

GENERATE A VISUALIZATION BASED ON THE LATERAL
MOVEMENT PATH AND THE FORENSIC FINDING

S640

OPTIONALLY UPDATE THE VISUALIZATION

TECHNIQUES FOR INCIDENT RESPONSE AND STATIC ANALYSIS REPRESENTATION IN COMPUTING ENVIRONMENTS

CROSS-REFERENCE TO RELATED APPLICATION

This application is a continuation of U.S. Non-Provisional application Ser. No. 18/737,481, filed Jun. 7, 2024, the contents of which are hereby incorporated.

TECHNICAL FIELD

The present disclosure relates generally to incident response in cybersecurity and specifically to techniques for representing computing environments, incidents, and forensic findings in the computing environment.

BACKGROUND

Incident response and cybersecurity forensics in cloud computing environments involve the processes and techniques used to detect, investigate, mitigate, and recover from security incidents or breaches within cloud-based systems. These environments present unique challenges due to their distributed nature, shared responsibility model, and reliance on third-party providers.

Static analysis techniques are utilized for example to detect cybersecurity risks on applications, resources, computer code, and the like, which is deployed in a computing environment.

Each of these fields of cybersecurity generates various outputs based events that occur in computing environments, where the amount of data generated can be tremendous and difficult to present and make sense of.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a forensic artifact in a computing environment, the forensic artifact including an identifier of a resource deployed in the computing environment. Method may also include inspecting the resource for a cybersecurity object, the cybersecurity object indicating a cybersecurity issue. Method may furthermore include generating a representation of: the detected forensic artifact, the resource, and the cybersecurity object, in a security database, where the security database includes a representation of the computing environment. Method may in addition include generating a potential lateral movement path between the resource and another resource. Method may moreover include generating a visualization based on the potential lateral movement, the forensic artifact, and the cybersecurity object. Other embodiments of this aspect include corresponding computer systems, apparatus, and computer programs recorded on one or more computer storage devices, each configured to perform the actions of the methods.

Implementations may include one or more of the following features. Method may include: generating a forensic finding based on the forensic artifact. Method may include: inspecting the another resource for a cybersecurity object indicating the cybersecurity issue; and determining that the potential lateral movement path is a confirmed lateral movement path in response to detecting the cybersecurity object on the another resource. Method may include: determining a number of hops between the resource and the another resource; and generating the potential lateral movement path in response to determining that the number of hops is less than a threshold value. Method may include: generating a truncated forensic record; and generating the visualization based on the potential lateral movement, the truncated forensic record and the cybersecurity object. Method may include: generating an inspectable disk based on the resource; and inspecting the inspectable disk for the cybersecurity object. Method may include: detecting the forensic artifact in a log of the computing environment, the log including a plurality of data records, each data record corresponding to an event. Method may include: parsing a data record of the plurality of data records; and extracting a value from a predetermined data field detected based on the parsed data record. Method may include: traversing the security database to detect a representation of an entity of the computing environment; and generating the visualization further based on another representation connected to the representation of the entity. Implementations of the described techniques may include hardware, a method or process, or a computer tangible medium.

In one general aspect, non-transitory computer-readable medium may include one or more instructions that, when executed by one or more processors of a device, cause the device to: detect a forensic artifact in a computing environment, the forensic artifact including an identifier of a resource deployed in the computing environment; inspect the resource for a cybersecurity object, the cybersecurity object indicating a cybersecurity issue; generate a representation of: the detected forensic artifact, the resource, and the cybersecurity object, in a security database, where the security database includes a representation of the computing environment; generate a potential lateral movement path between the resource and another resource; and generate a visualization based on the potential lateral movement, the forensic artifact, and the cybersecurity object. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect a forensic artifact in a computing environment, the forensic artifact including an identifier of a resource deployed in the computing environment. System may in addition include inspect the resource for a cybersecurity object, the cybersecurity object indicating a cybersecurity issue. System may moreover generate a representation of: the detected forensic artifact, the resource, and the cybersecurity object, in a security database, where the security database includes a representation of the computing environment. System may furthermore generate a potential lateral movement path between the resource and another resource. System may in addition generate a visualization based on the potential lateral movement, the forensic artifact, and the cybersecurity object. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: generate a forensic finding based on the forensic artifact. System where the memory contains further instructions which when executed by the processing circuitry further configure the system to: inspect the another resource for a cybersecurity object indicating the cybersecurity issue; and determine that the potential lateral movement path is a confirmed lateral movement path in response to detecting the cybersecurity object on the another resource. System where the memory contains further instructions which when executed by the processing circuitry further configure the system to: determine a number of hops between the resource and the another resource; and generate the potential lateral movement path in response to determining that the number of hops is less than a threshold value. System where the memory contains further instructions which when executed by the processing circuitry further configure the system to: generate a truncated forensic record; and generate the visualization based on the potential lateral movement, the truncated forensic record and the cybersecurity object. System where the memory contains further instructions which when executed by the processing circuitry further configure the system to: generate an inspectable disk based on the resource; and inspect the inspectable disk for the cybersecurity object. System where the memory contains further instructions which when executed by the processing circuitry further configure the system to: detect the forensic artifact in a log of the computing environment, the log including a plurality of data records, each data record corresponding to an event. System where the memory contains further instructions which when executed by the processing circuitry further configure the system to: parse a data record of the plurality of data records; and extract a value from a predetermined data field detected based on the parsed data record. System where the memory contains further instructions which when executed by the processing circuitry further configure the system to: traverse the security database to detect a representation of an entity of the computing environment; and generate the visualization further based on another representation connected to the representation of the entity. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
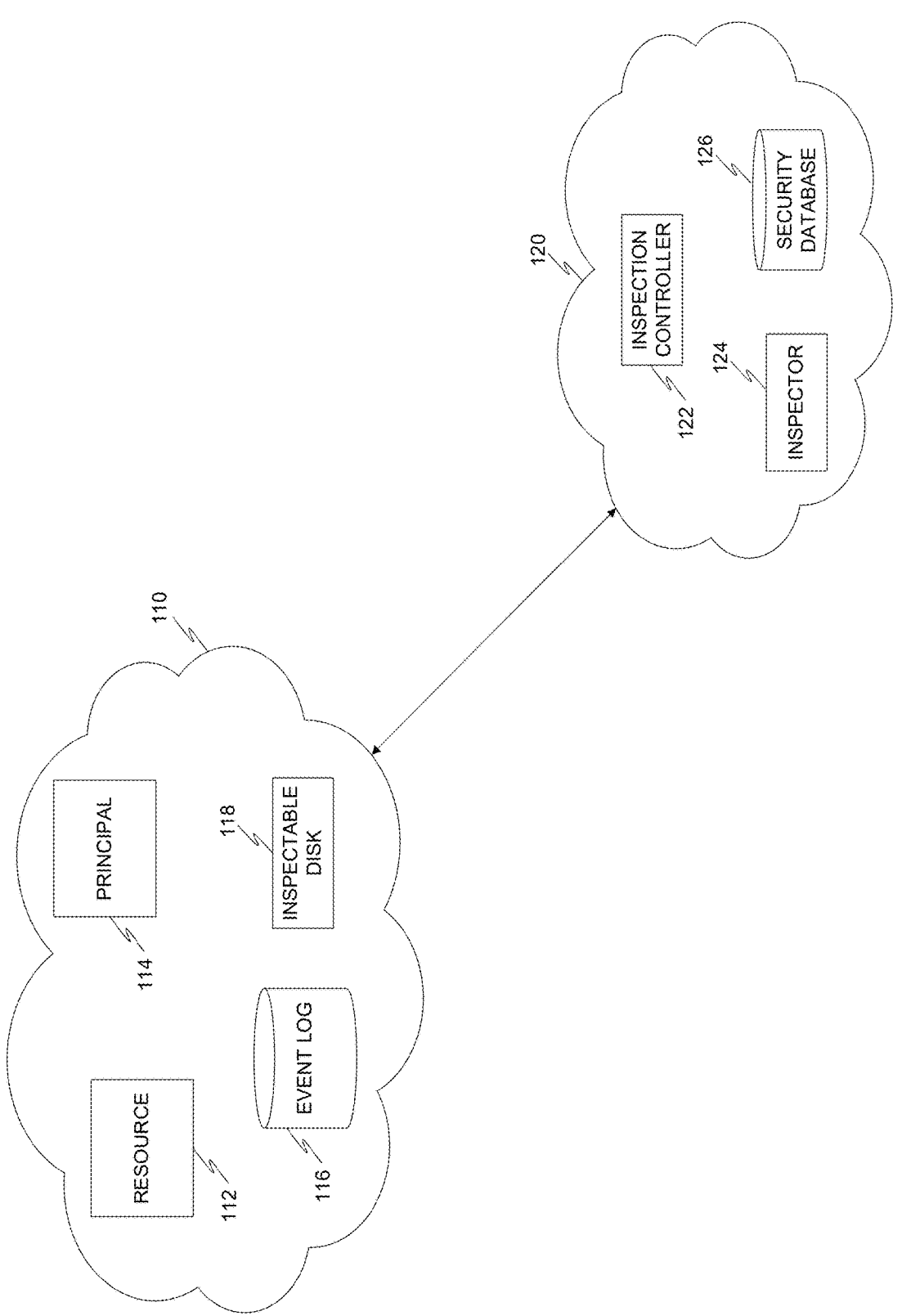
FIG. 1 is an example schematic illustration of a computing environment including a cybersecurity issue, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a computing environment including a cybersecurity issue, utilized to describe an embodiment. In an embodiment, a computing environment 110 includes a plurality of resources, such as resource 112, and a plurality of principals, such as principal 114.

In some embodiments, a resource 112 is a hardware resource, a software based resource, and the like, which is accessible by a principal of the computing environment 110, such as principal 114. In an embodiment, a resource 112 is, for example, a virtual machine (VM), a software container, a serverless function, an application, a combination thereof, and the like.

For example, according to an embodiment, a VM is implemented as an Oracle® VirtualBox®, a software container is implemented utilizing a Docker® Platform, a Kubernetes® platform, and the like, and a serverless function is implemented as an Amazon® Lambda function.

In certain embodiments, a principal 114 is an entity of the computing environment 110 which is configured to access a resource 112, initiate operations in the computing environment 110, access components and elements of the computing environment 110, a combination thereof, and the like. For example, in an embodiment, a principal 114 is, for example, a service account, a user account, an administrator account, a user group, a local account, a network account, a combination thereof, and the like.

According to an embodiment, the computing environment 110 is a networked computing environment, a cloud computing environment, a hybrid computing environment, an on-prem computing environment, a combination thereof, and the like. In an embodiment, a cloud computing environment includes a virtual private cloud (VPC), a virtual network (VNet), a combination thereof, and the like. In certain embodiments, the computing environment 110 includes a virtual private network (VPN). In an embodiment, a resource 112 is associated with a VPC, a VNet, a VPN, a combination thereof, and the like.

In some embodiments, a cloud computing environment is deployed on a cloud computing infrastructure. For example, according to an embodiment, a cloud computing infrastructure is Amazon® Web Services (AWS), Google® Cloud Platform (GCP), Microsoft® Azure, and the like.

In an embodiment, events which occur in the computing environment 110 are stored as data records, for example as a record in an event log 116. In some embodiments, the event log is implemented using Amazon® CloudTrail, for example. In an embodiment, a serverless function is configured to monitor a resource in the computing environment 110 and write an event to a CloudTrail bucket. A bucket is a cloud computing storage mechanism.

In certain embodiments, an event log 116 includes a plurality of data records, each data record corresponding to an event in the computing environment 110. For example, according to some embodiments, an event is a communication between a first resource and a second resource, an access of a resource by a principal, generation of a principal, a combination thereof, and the like.

In an embodiment, the computing environment 110 is monitored by an inspection environment 120. According to an embodiment, the inspection environment 120 is implemented as a computing environment, such as a cloud computing environment. In some embodiments, a portion of the inspection environment 120 is deployed in the computing environment 110.

In certain embodiments, the inspection environment 120 includes an inspection controller 122, an inspector 124, and a security database 126. In an embodiment, the inspection controller 122 is configured to select entities, such as resources, in the computing environment 110 for inspection. In some embodiments, the inspection controller 122 is configured to detect a resource in the computing environment 110 which includes a disk. In an embodiment, the disk is a data disk, an OS disk, a combination thereof, and the like.

According to some embodiments, an inspection controller 122 is configured to generate an inspectable disk 118. In an embodiment, the inspection controller 122 is configured to generate an inspectable disk 118 by cloning, snapshotting, copying, and the like, the detected disk.

In an embodiment, a cloned disk includes a disk pointer pointing to an address in a computing storage system. In some embodiments, the address is an address utilized by the original disk, such that a disk pointer of the original disk and a disk address of the cloned disk point to the same address.

In certain embodiments, a snapshot is a full copy in time of a cloned disk. In some embodiments, it is less advantageous to utilize a snapshot than a clone, as a snapshot is not available instantaneously, while a clone is, as the cloned disk includes a pointer which points to the address of the original disk.

In an embodiment, the inspection controller 122 is configured to initiate an instance of an inspector 124. In certain embodiments, an inspector 124 is configured to inspect a resource, such as the inspectable disk 118 for a cybersecurity object.

According to an embodiment, a cybersecurity object indicates a cybersecurity issue. In an embodiment, a cybersecurity object is a code object, a file, a filesystem, an application, an operating system, an identifier thereof, a software library, a software binary, a malware, a password, a certificate, a cryptographic key, a token, a combination thereof, and the like.

In some embodiments, a plurality of cybersecurity objects indicate together a cybersecurity issue. For example, in an embodiment, a software library (version thereof, and the like) indicate a misconfiguration. In an embodiment, the software library and a stored certificate together indicate a cybersecurity risk.

In certain embodiments, a cybersecurity risk includes a vulnerability, an exposure, a misconfiguration, a toxic combination, a combination thereof, and the like. In some embodiments, an inspection controller 122 is configured to initiate a remediation action in the computing environment 110 in response to detecting a cybersecurity risk.

In an embodiment, a security database 126 is configured to store a representation of the computing environment 110. According to some embodiments, the security database 126 is implemented as a graph database, for example utilizing Neo4j®. In certain embodiments, the security database 126 includes a data schema which is a unified data schema.

In some embodiments, a unified data schema is utilized to represent entities from different computing environments, such that a virtual machine from a first computing environment (e.g., AWS) is represented using the same schema as a virtual machine from a second computing environment (e.g., GCP).

In an embodiment, the security database 126 is configured to store the representation of the computing environment 110 based on a result from the inspector 124, an enrichment generated by the inspection controller 122, a combination thereof, and the like.

In certain embodiments, the security database 126 is configured to store a representation of the computing environment 110 including a representation of an entity of the computing environment 110, an enrichment, an application endpoint, a resource, a principal, a cybersecurity object, a cybersecurity issue, a remediation action, a combination thereof, and the like.

For example, according to some embodiments, the security database 126 is a graph database, where nodes of the graph represent enrichments, endpoints, resources, principals, etc. An example of such a security graph is discussed in more detail with respect to FIG. 2 below.

In certain embodiments, an inspection controller 122 is configured to generate a forensic finding. In an embodiment, a forensic finding is generated based on a cybersecurity object, a data record from an event log, a combination thereof, and the like. In an embodiment, a forensic finding indicates a cybersecurity issue was exploited.

Figure 2:
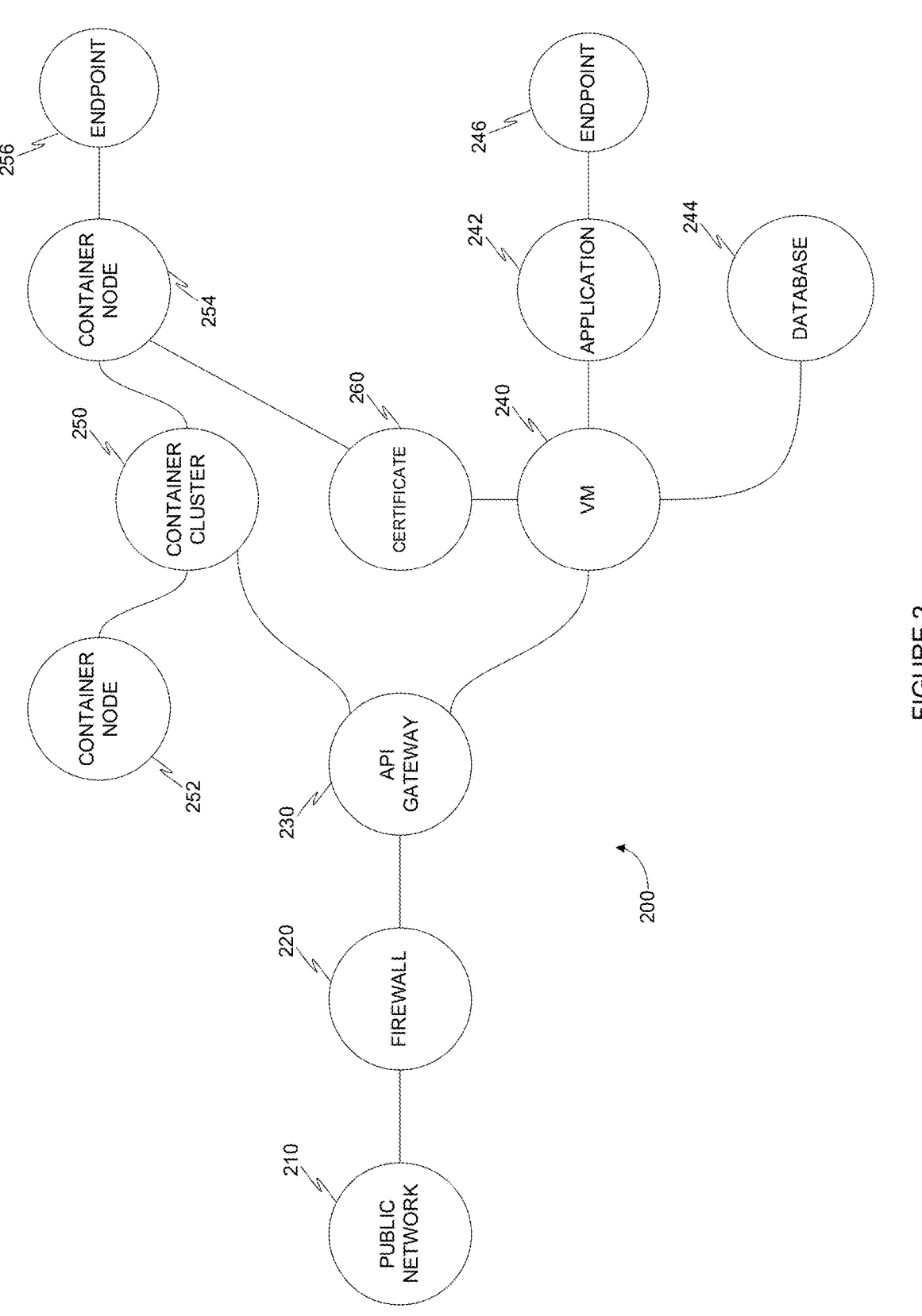
FIG. 2 is an example security graph portion, implemented in accordance with an embodiment.

FIG. 2 is an example security graph portion, implemented in accordance with an embodiment. In an embodiment, the security graph 200 includes a plurality of nodes, each node connected to at least another node by an edge. In certain embodiments, a pair of nodes are connected by a plurality of edges. In some embodiments, each edge indicates a type of connection between the nodes. For example, an edge indicates a "can access", to indicate that a cloud entity represented by a first node is configured to access the cloud entity represented by a second node, according to an embodiment.

A first enrichment node 210 (also referred to as public network node 210) represents a public network. An enrichment node, such as enrichment node 210, is a node generated based off of insights determined from data collected from a computing environment, such as the computing environment 110 of FIG. 1 above. In an embodiment, a detected network is enriched with data, for example to indicate that the network is a public network, is accessible from a public network, etc.

According to an embodiment, an enrichment node represents, for example, a vulnerability. By connecting resource nodes in the graph to the enrichment node representing a vulnerability, the security graph 200 indicates that the resources contain the vulnerability. This allows a compact representation as the security graph does not redundantly store multiple data fields of the same vulnerability in each resource node which each represent a resource with the vulnerability.

In an embodiment, the public network node 210 is connected to a first resource node 220 (also referred to as firewall node 220) representing a firewall workload. The firewall represented by the firewall node 220 is implemented, in an embodiment, as a virtual machine in a cloud computing environment. Connecting the public network node 210 to the firewall node 220 represents that the firewall is open to transceiving communication between itself and the public network.

The firewall node 220 is further connected to a second resource node 230 (also referred to as API gateway node 230) which represents an API (application programming interface) gateway, in an embodiment. In some embodiments, an API gateway is a workload, for example a serverless function, which acts as a reverse proxy between a client and resources, accepting API calls, directing them to the appropriate service, workload, resource, etc. and returning a result to the client when appropriate.

The API gateway node 230 is connected to a third principal node 240 (also referred to as VM node 240) representing a virtual machine hosting an application and a database, and the API gateway node 230 is also connected to a fourth principal node 250 (also referred to as container cluster node 250) which hosts a plurality of container nodes.

In an embodiment, the VM node 240 is connected to an application node 242, and a database node 244. The application node 242 may indicate, for example, that a certain application, having a version number, binaries, files, libraries, and the like, is executed on the VM which is represented by the VM node 240. In an embodiment, the application node 242 is connected to an application endpoint node 246, indicating that the application includes an application endpoint, which potentially exposes the VM represented by VM node 240 to an external network.

In an embodiment, the VM node 240 is connected to a plurality of application nodes. According to an embodiment, the database node 244 represents a database which is stored on the VM (represented by VM node 240), or stored on a storage accessible by the VM. The database node 244 includes attributes which define a database, such as type (graph, columnar, distributed, etc.), version number, query language, access policy, and the like, in an embodiment.

In some embodiments, the container cluster includes a plurality of container nodes, which are represented for example by first container node 252 and second container node 254. In an embodiment, the second container node 254 includes an application endpoint, represented by an application endpoint node 256.

In an embodiment, a lateral movement is possible between the virtual machine represented by VM node 240 and the container cluster node represented by container node 254. This is indicated by a certificate node 260 representing a certificate which allows access to both the virtual machine and the software container node.

For example, in an embodiment, gaining access to the virtual machine represented by VM node 240 allows gaining access to the certificate represented by certificate node 260. Thus lateral movement is possible from one resource to another. In certain embodiment, the security graph is further configured to store accessibility paths to a resource.

In some embodiments, an accessibility path includes a plurality of reachability parameters. In an embodiment, a reachability parameter includes a network path, an IP address, a port, a network name, a combination thereof, and the like.

In certain embodiments, a forensic finding is detected, for example by an inspector, on a resource such as the virtual machine represented by the VM node 240. In an embodiment, a forensic finding is generated based on a detected artifact which is detected, for example, on a disk of the virtual machine. In certain embodiments, the forensic finding is represented as a node in the security graph.

Figure 3:
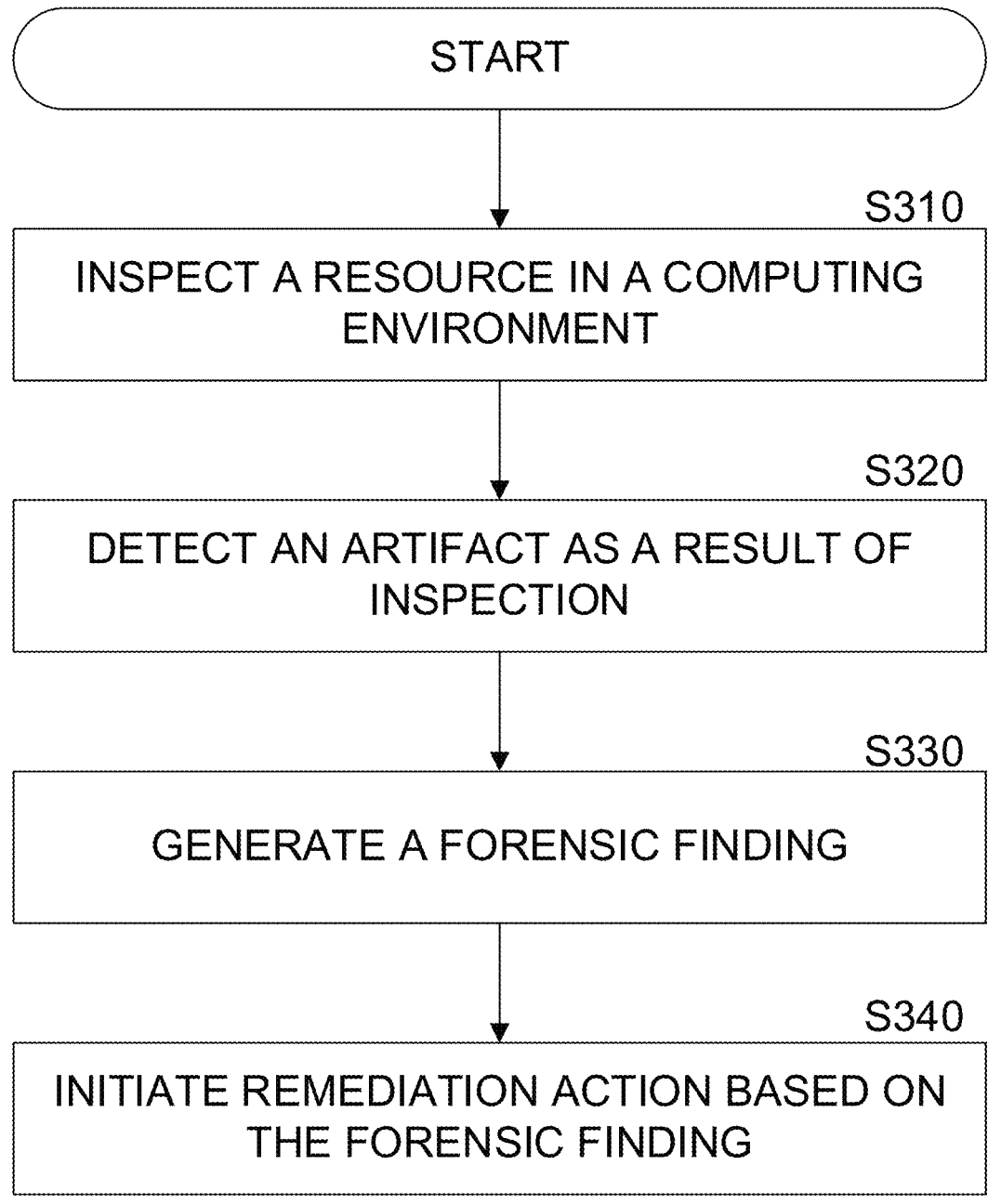
FIG. 3 is a flowchart of a method for generating a forensic finding for a computing environment, implemented in accordance with an embodiment.

FIG. 3 is a flowchart of a method for generating a forensic finding for a computing environment, implemented in accordance with an embodiment. According to an embodiment, a forensic finding is an indication that an entity, such as a resource, has been exploited.

At S310, a resource is inspected. In an embodiment, inspecting a resource includes detecting a resource in a computing environment, for example, by querying an API of the computing environment to perform network discovery. In an embodiment, querying an API, for example of a cloud computing environment, provides an inspection controller with identifiers of a plurality of resources.

In an embodiment, the inspection controller is configured to provision an inspector, a plurality of inspectors, etc., to inspect the resource for a cybersecurity object. In some embodiments, the cybersecurity object is a forensic artifact. In certain embodiments, a forensic artifact indicates that a resource was exploited. For example, in an embodiment, a user account is generated with a permission, and a record indicating this is stored on the resource which is utilized to generate the account.

At S320, an artifact is detected. In an embodiment, an artifact is detected utilizing an inspector. For example, in an embodiment, an artifact is a cybersecurity object which an inspector is configured to detect.

In certain embodiments, a forensic artifact is a data record in a log file, for example including timestamped records of user authentication attempts. In an embodiment, a log file record includes a source IP address, a username, success of a login attempt, failure of a login attempt, a combination thereof, and the like.

At S330, a forensic finding is generated. In some embodiments, a forensic finding is generated based on a detected forensic artifact, a plurality of detected forensic artifacts, and the like. In an embodiment, a forensic finding is represented on a security graph, for example as discussed in more detail herein.

In some embodiments, a forensic finding is represented as a node in a security graph. In certain embodiments, a forensic finding is represented as an edge in the security graph. For example, in an embodiment, a portion of the forensic finding, such as the forensic artifact, is represented as an edge on the security graph. In some embodiments, a first resource node is connected to a second resource node via an edge which indicates that the first resource accessed the second resource. As another example, in an embodiment, the edge indicates that the first resource attempted to access the second resource multiple times.

At S340, a remediation action is initiated. In an embodiment, the remediation action is initiated based on the forensic finding. In some embodiments, the remediation action is represented in the security database, for example as a node in a security graph. In certain embodiments, a forensic finding type is represented by a node which in turn is connected to a node representing a remediation action which is based on the type of forensic finding.

In certain embodiments, a remediation action includes revoking a permission from a principal, revoking access to a resource, revoking access from a resource, sandboxing a resource, quarantining a resource, quarantining an application, generating an alert, generating a ticket in a ticketing system, initiating a remediation script, initiating a mitigation action, a combination thereof, and the like.

In some embodiments, the remediation action is initiated on a resource which relates to the forensic finding (e.g., on which an artifact is detected). In certain embodiments, the remediation action is initiated with respect to another resource, another principal, and the like, which is connected in the security database to the representation of the resource, principal, and the like, on which a forensic artifact is detected.

Figure 4:
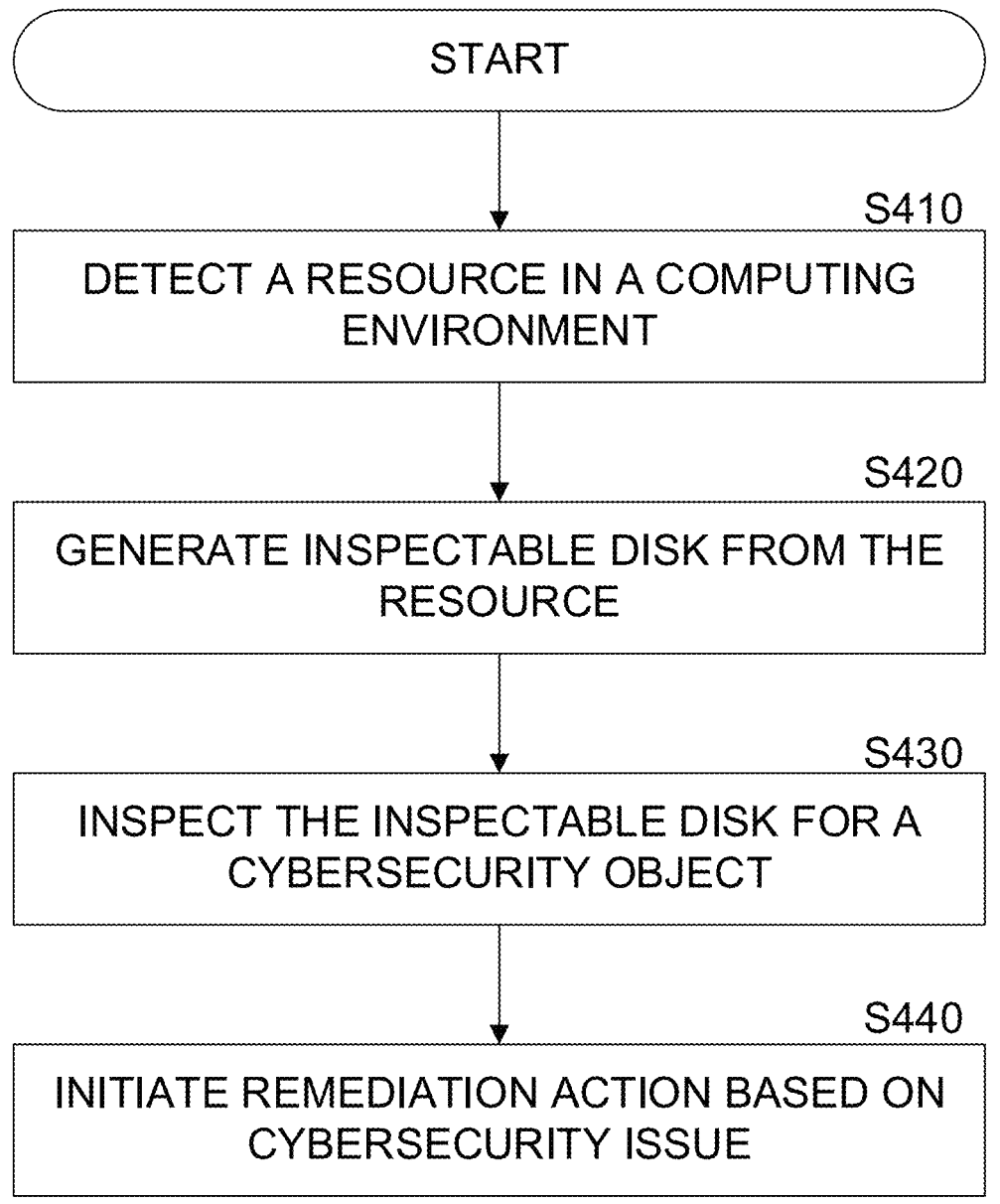
FIG. 4 is a flowchart of a method for inspecting an entity of a computing environment for a cybersecurity issue, implemented according to an embodiment.

FIG. 4 is a flowchart of a method for inspecting an entity of a computing environment for a cybersecurity issue, implemented according to an embodiment. According to an embodiment, a cybersecurity issue includes a cybersecurity risk, such as a misconfiguration, an exposure, a vulnerability, a malware, a combination thereof, and the like.

At S410, a resource is detected in a computing environment. In an embodiment, detecting a resource in a computing environment includes querying an API of a computing environment, such as a cloud computing environment. In certain embodiments, a result of the API query includes a plurality of identifiers of resources in the computing environment. In some embodiments, the result of the API query includes a plurality of identifiers of principals in the computing environment.

In an embodiment, a resource is detected which includes a disk. For example, in an embodiment, the resource is a virtual machine, a software container, a combination thereof, and the like. In certain embodiments, a disk includes a disk descriptor which has an address to a storage, such as a cloud computing storage system.

At S420, an inspectable disk is generated. In an embodiment, the inspectable disk is generated based on the detected disk of the resource. For example, in an embodiment, the original disk is cloned by generated a cloned disk. In an embodiment, the cloned disk includes a disk descriptor which points to the storage address of the original disk.

In certain embodiments, the disk descriptor, any other resource, and the like, which is provisioned to the cloned disk, is released in response to completing inspection. In an embodiment, the inspectable disk is inspected for a cybersecurity object.

At S430, the inspectable disk is inspected for a cybersecurity object. In an embodiment, the cybersecurity object is a code object, a file, a filesystem, an application, an operating system, an identifier thereof, a software library, a software binary, a malware, a password, a certificate, a cryptographic key, a token, a combination thereof, and the like.

According to an embodiment, the cybersecurity object is represented on the security database, for example as a node in a security graph. In some embodiments, a representation of the cybersecurity object is connected to a representation of a resource on which the cybersecurity object is detected.

In an embodiment, an inspector is configured to inspect the inspectable disk for the cybersecurity object. In some embodiments, a plurality of inspectors are configured each to inspect the inspectable disk for a cybersecurity object (i.e., each inspector inspects for different objects).

At S440, a remediation action is initiated. In some embodiments, a mitigation action is initiated. In an embodiment, the remediation action is initiated in response to detecting a cybersecurity object. In certain embodiments, the cybersecurity object indicates a cybersecurity issue.

In an embodiment, a toxic combination is detected based on detecting a plurality of cybersecurity objects, which together form a toxic combination. For example, in an embodiment, detecting an exposed resource which has stored thereon a key which provides access to another resource is a toxic combination, as each of the detected issues is less significant individually than the combination of issues as a whole.

Figure 5:
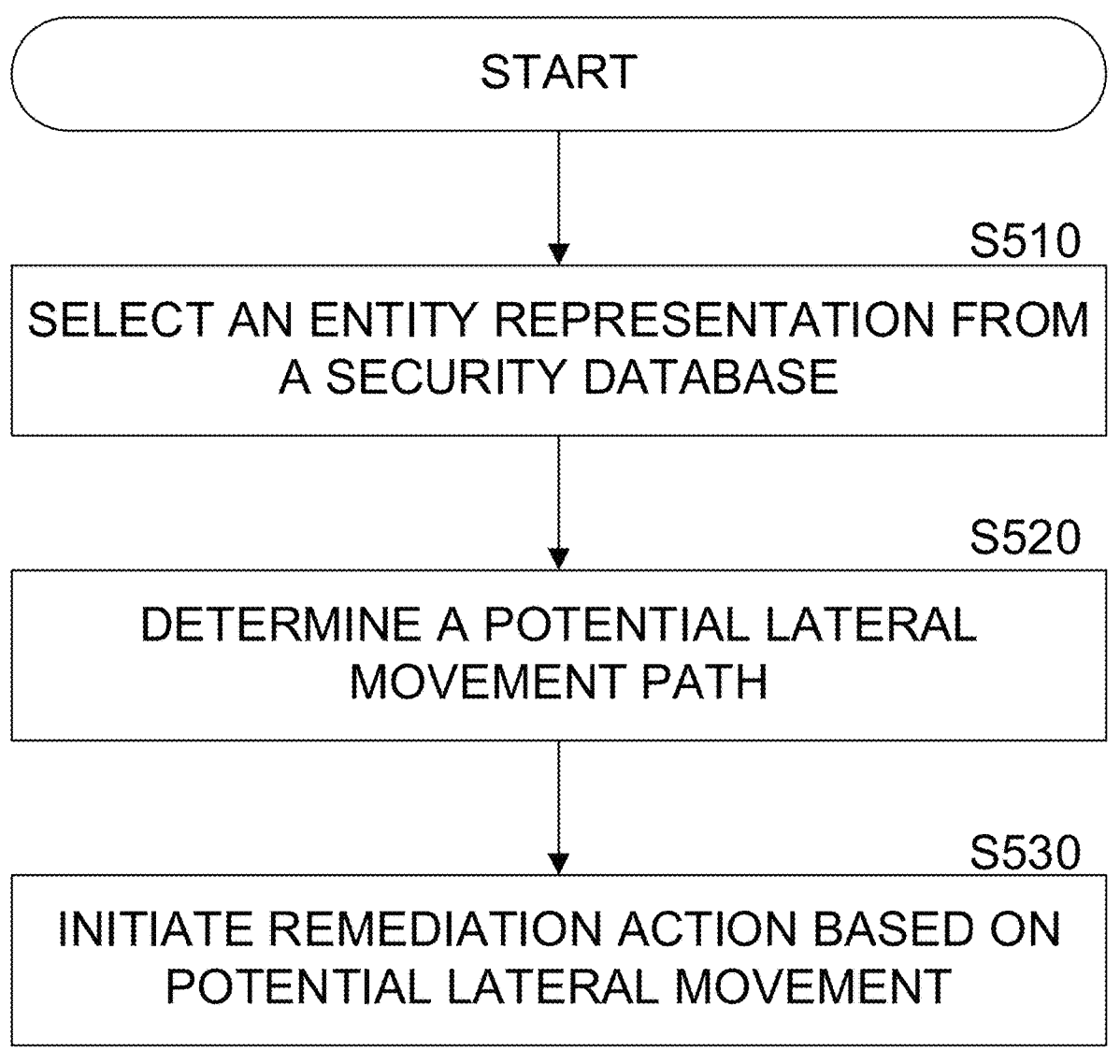
FIG. 5 is a flowchart for detecting potential lateral movement paths in a networked computing environment, implemented in accordance with an embodiment.

FIG. 5 is a flowchart for detecting potential lateral movement paths in a networked computing environment, implemented in accordance with an embodiment. In an embodiment, a potential lateral movement path is detected utilizing a security database, such as the security graph discussed in more detail in FIG. 2 above.

At S510, a representation is selected in a security database. In an embodiment, the representation is a representation of a resource, a principal, and the like. In some embodiments, the security database is a graph database. In an embodiment, entities, enrichments, and the like, are represented in a graph database as nodes in the graph.

In an embodiment, the representation is connected to a representation of a cybersecurity object. In some embodiments, the cybersecurity object provides access to another resource, another principal, etc. For example, according to certain embodiments, the cybersecurity object is a password, a cryptographic key, a cloud key, an SSH key, a certificate, a token, a combination thereof, and the like.

In an embodiment, access to the cybersecurity object provides potential access to other resources, principals, and the like. For example, in an embodiment, a token allows a first principal having a first permission set to assume a role, a second principal, and the like, having a second permission set which includes a permission which is not included the first permission set, thereby leading to a permission escalation event.

At S520, a potential lateral movement path is determined. In an embodiment, a potential lateral movement path is determined by traversing a security graph from the selected representation to a representation of a cybersecurity object, and from the cybersecurity object to a representation of another resource, another principal, and the like.

In some embodiments, a potential lateral movement path includes a plurality of cybersecurity objects. In an embodiment, a hop is defined as a path which includes a first resource node, a first cybersecurity object, and a second resource node, such that the first resource node and the second resource node are both connected to the first cybersecurity object.

In certain embodiments, a potential lateral movement path includes a plurality of hops. For example, in an embodiment, a potential lateral movement path includes two hops, such that the path includes a first resource node, a first cybersecurity object, a second resource node, a second cybersecurity object, and third resource node, so that the first resource node and the second resource node are connected to the first cybersecurity object, and the second resource node and the third resource node are both connected to the third resource node.

At S530, a remediation action is initiated. In an embodiment, a remediation action is generated for each potential lateral movement path of a plurality of lateral movement paths. According to some embodiments, a remediation action includes generating an alert, updating a severity of an alert, generating a ticket in a ticketing system, initiating a mitigation action, initiating inspection of a resource, a combination thereof, and the like.

For example, according to an embodiment, a remediation action includes initiating inspection of a resource on which a cybersecurity object is detected which allows access to another resource. In an embodiment, where a cybersecurity issue is detected on the resource, a remediation action, a mitigation action, and the like, are initiated on the resource in response to such detection.

Figure 6:
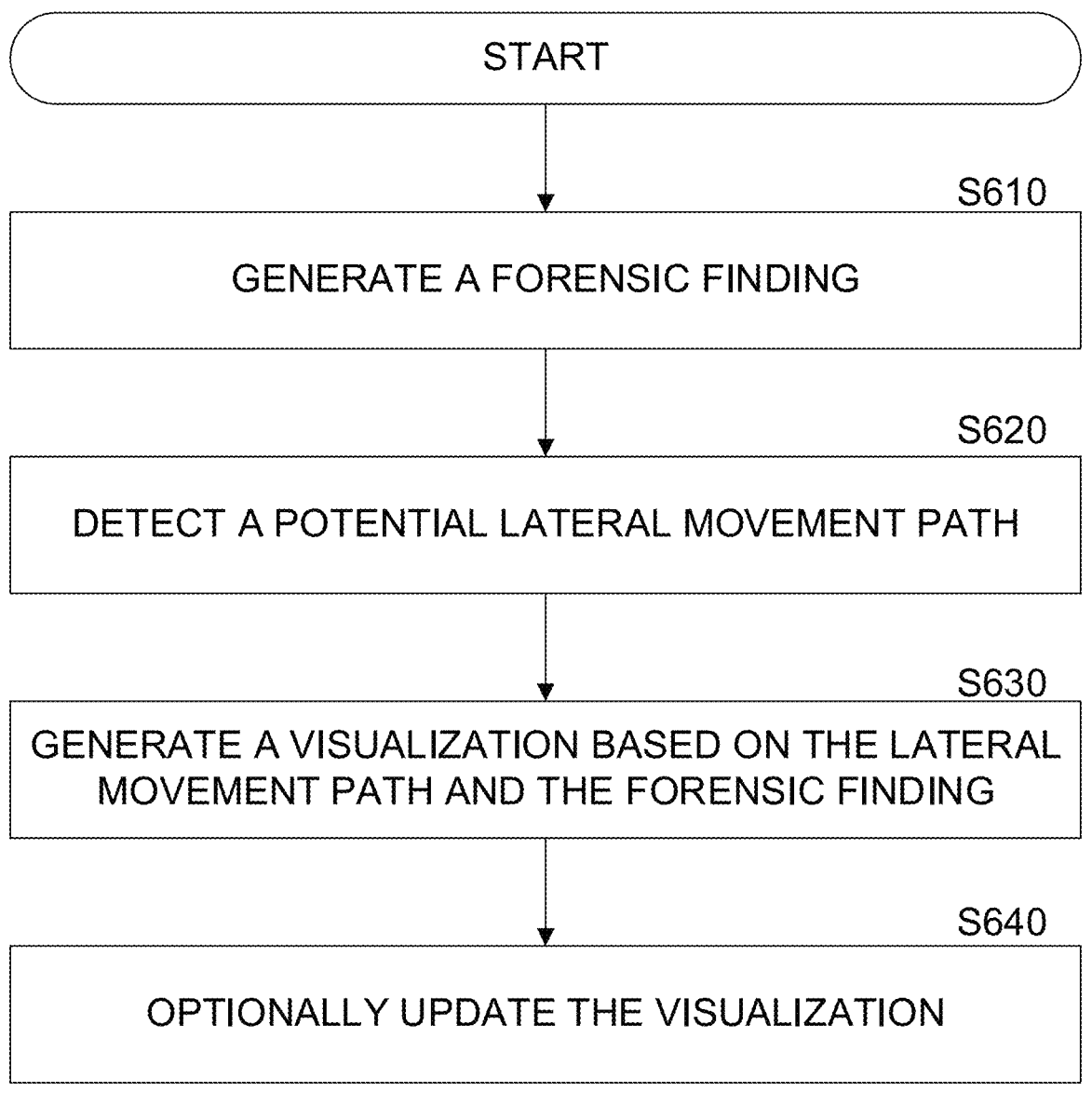
FIG. 6 is a flowchart of a method for generating a visualization of a cybersecurity incident, implemented in accordance with an embodiment.

FIG. 6 is a flowchart of a method for generating a visualization of a cybersecurity incident, implemented in accordance with an embodiment. In some embodiments, a cybersecurity incident includes a forensic finding indicating that an exposure, a vulnerability, and the like, were exploited.

At S610, a forensic finding is generated. In an embodiment, a forensic finding is generated based on a forensic artifact. A method for generating a forensic finding and detecting a forensic artifact are discussed in more detail herein.

According to some embodiments, a forensic artifact includes a log entry, a data record, a detected file, a detected record, a combination thereof, and the like. In certain embodiments, a truncated forensic record is generated. In some embodiments, a truncated forensic record is generated based on a forensic artifact, a forensic finding, a combination thereof, and the like. In an embodiment, a truncated forensic finding is advantageous as it is shorter to display than a full data record.

In some embodiments, generating a truncated forensic record includes parsing a data record of a log, extracting values corresponding to predetermined data fields which are detected in the data record, and generating the truncated forensic record based on the extracted values and a template of a truncated forensic record.

At S620, a potential lateral movement path is detected. In an embodiment, an identifier of a resource, an identifier of a principal, and the like, is detected in the forensic finding. In some embodiments, a security graph is traversed to detect a node which corresponds to the detected identifier. In an embodiment, the security graph is further traversed to detect the potential lateral movement path based on detecting a node corresponding to the detected identifier.

In an embodiment, the potential lateral movement path includes a single hop, a plurality of hops, etc. In certain embodiments, a plurality of potential lateral movement paths are detected. For example, in an embodiment, a first potential lateral movement path originates from a first resource, and includes one hop (i.e., to a resource, a principal, and the like, which is one hop away from the first resource).

In certain embodiments, a second potential lateral movement path originates from the first resource and includes a resource, a principal, and the like, which are a plurality of hops from the first resource. In some embodiments, the number of plurality of hops (i.e., the number of hops) is predefined.

In an embodiment, a user interface is configured to receive an input which when received configures the user interface to display another lateral movement path, a lateral movement path with an increased number of hops, a lateral movement path with a decreased number of paths, a combination thereof, and the like.

At AS630, a visualization is generated. In an embodiment, a visualization is generated based on the detected forensic finding. In some embodiments, a detected forensic finding is associated with an identifier of an entity of a computing environment. For example, in an embodiment, the identifier is an identifier of a resource, a principal, and the like.

In certain embodiments, the identifier is utilized in querying a security database. In an embodiment, the generated visualization is generated as a graph, graph including a plurality of nodes, a portion of which represent resources of the computing environment and a portion of which represent principals of the computing environment.

In an embodiment, the graph of the visualization further includes nodes which each represent a cybersecurity object. In an embodiment, the visualization further includes generating a visual component of an edge connecting a plurality of nodes. In some embodiments, the edge visual component includes a textual component. In an embodiment, the textual component corresponds to a truncated forensic record.

According to an embodiment, the visualization further includes runtime data received from a sensor deployed on a resource. In some embodiments, data received from the sensor is received by an inspection environment, where an inspection controller is configured to store such data in the security database. In an embodiment, the runtime data, processed runtime data, and the like, is displayed in proximity to a visual representation of a resource, principal, and the like, to which the runtime data pertains.

In some embodiments, the visualization includes enrichment nodes. In an embodiment, an enrichment node represents an external IP address, a domain name, an action, a context, a process, a subscription, a service, a combination thereof, and the like.

At optional S640, the visualization is updated. In an embodiment, the visualization is updated based on an input received, for example from a graphical user interface on which the visualization is displayed. In some embodiments, updating the visualization includes generating a lateral movement path, increasing a number of hops of a lateral movement path, decreasing a number of hops of a lateral movement path, adding an enrichment node to the visualization, adding an edge to the visualization, adding a forensic finding to the visualization, adding a context to the visualization, adding an action to the visualization, a combination thereof, and the like.

In some embodiments, an action, an enrichment, a forensic finding, a context, and the like, are detected for example in a log of a computing environment. In certain embodiments, the log includes data records which are parsed and searched for a keyword, data field, and the like, which indicate the action, forensic artifact, context, etc.

Figure 7:
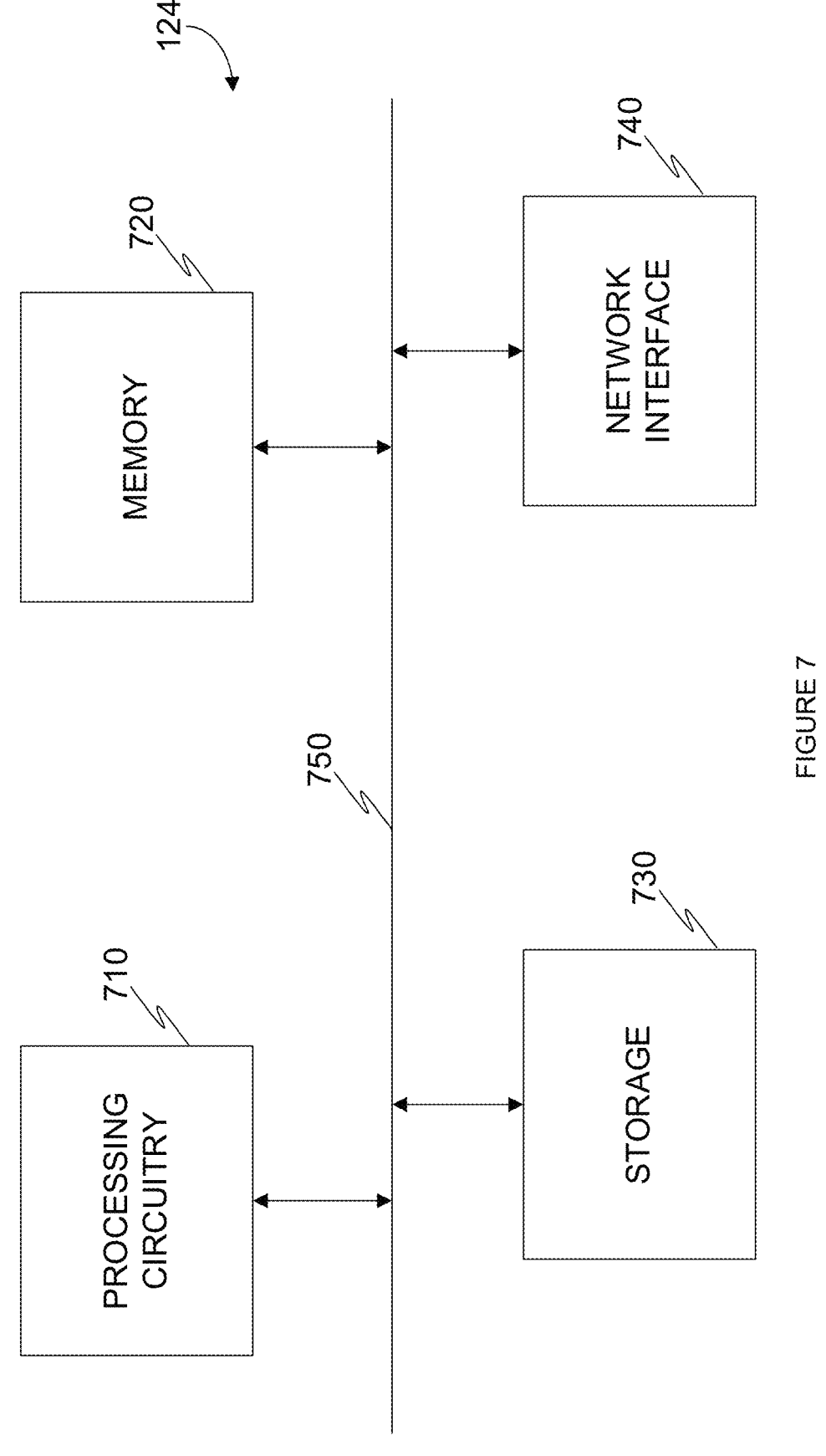
FIG. 7 is an example schematic diagram of an inspection controller according to an embodiment.

FIG. 7 is an example schematic diagram of an inspection controller 122 according to an embodiment. The inspection controller 122 includes, according to an embodiment, a processing circuitry 710 coupled to a memory 720, a storage 730, and a network interface 740. In an embodiment, the components of the inspection controller 122 are communicatively connected via a bus 750.

In certain embodiments, the processing circuitry 710 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 720 is a volatile memory (e.g., random access memory, etc.), a non-volatile memory (e.g., read only memory, flash memory, etc.), a combination thereof, and the like. In some embodiments, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein is stored in the storage 730, in the memory 720, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 710, cause the processing circuitry 710 to perform the various processes described herein, in accordance with an embodiment.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 is configured to provide the inspection controller 122 with communication with, for example, the inspector 124, the security database 126, the inspectable disk 118, and the like, according to an embodiment.

It should be understood that the embodiments described herein are not limited to the specific architecture illustrated in FIG. 7, and other architectures may be equally used without departing from the scope of the disclosed embodiments.

Furthermore, in certain embodiments the inspector 124, security database 126, a combination thereof, and the like, may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting an attack path in a computing environment, comprising:

detecting a forensic artifact in a computing environment, the forensic artifact including an identifier of a resource deployed in the computing environment;

generating an inspectable disk based on the resource;

inspecting the inspectable disk for a cybersecurity object, the cybersecurity object indicating a cybersecurity issue;

generating in a security database a representation of: the detected forensic artifact, the resource, and the cybersecurity object, wherein the security database further includes a representation of the computing environment;

determining a number of hops between the resource and another resource;

generating a potential lateral movement path between the resource and the another resource, the lateral movement path including at least another entity deployed in the computing environment between the resource and the another resource;

generating a visualization based on the potential lateral movement; and initiating a remediation action based on the cybersecurity issue.

2. The method of claim 1, further comprising:
generating a forensic finding based on the forensic artifact.

3. The method of claim 1, further comprising:
inspecting the another resource for a cybersecurity object indicating the cybersecurity issue; and
determining that the potential lateral movement path is a confirmed lateral movement path in response to detecting the cybersecurity object on the another resource.

4. The method of claim 1, further comprising:
generating the visualization further based on: the forensic artifact, and the cybersecurity object.

5. The method of claim 1, further comprising:
generating a truncated forensic record; and
generating the visualization based on the potential lateral movement, the truncated forensic record and the cybersecurity object.

6. The method of claim 1, further comprising:
detecting the forensic artifact in a log of the computing environment, the log including a plurality of data records, each data record corresponding to an event.

7. The method of claim 6, further comprising:
parsing a data record of the plurality of data records; and
extracting a value from a predetermined data field detected based on the parsed data record.

8. The method of claim 1, further comprising:
traversing the security database to detect a representation of an entity of the computing environment; and
generating the visualization further based on another representation connected to the representation of the entity.

9. A non-transitory computer-readable medium storing a set of instructions for detecting an attack path in a computing environment, the set of instructions comprising:
one or more instructions that, when executed by one or more processors of a device, cause the device to:
detect a forensic artifact in a computing environment, the forensic artifact including an identifier of a resource deployed in the computing environment;
generate an inspectable disk based on the resource;
inspect the inspectable disk for a cybersecurity object, the cybersecurity object indicating a cybersecurity issue;
generate in a security database a representation of:
the detected forensic artifact, the resource, and the cybersecurity object, wherein the security database further includes a representation of the computing environment;
determine a number of hops between the resource and another resource;
generate a potential lateral movement path between the resource and the another resource, the lateral movement path including at least another entity deployed in the computing environment between the resource and the another resource;
generate a visualization based on the potential lateral movement; and
initiate a remediation action based on the cybersecurity issue.

10. A system for detecting an attack path in a computing environment comprising:
a processing circuitry;
a memory, the memory containing instructions that, when executed by the processing circuitry, configure the system to:

detect a forensic artifact in a computing environment, the forensic artifact including an identifier of a resource deployed in the computing environment;
generate an inspectable disk based on the resource;
inspect the inspectable disk for a cybersecurity object, the cybersecurity object indicating a cybersecurity issue;
generate in a security database a representation of:
the detected forensic artifact, the resource, and the cybersecurity object, wherein the security database further includes a representation of the computing environment;
determine a number of hops between the resource and another resource;
generate a potential lateral movement path between the resource and the another resource, the lateral movement path including at least another entity deployed in the computing environment between the resource and the another resource;
generate a visualization based on the potential lateral movement; and
initiate a remediation action based on the cybersecurity issue.

11. The system of claim 10, wherein the memory contains further instructions which when executed by the processing circuitry further configure the system to:
generate a forensic finding based on the forensic artifact.

12. The system of claim 10, wherein the memory contains further instructions which when executed by the processing circuitry further configure the system to:
inspect the another resource for a cybersecurity object indicating the cybersecurity issue; and
determine that the potential lateral movement path is a confirmed lateral movement path in response to detecting the cybersecurity object on the another resource.

13. The system of claim 10, wherein the memory contains further instructions which when executed by the processing circuitry further configure the system to:
generate the visualization further based on: the forensic artifact, and the cybersecurity object.

14. The system of claim 10, wherein the memory contains further instructions which when executed by the processing circuitry further configure the system to:
generate a truncated forensic record; and
generate the visualization based on the potential lateral movement, the truncated forensic record and the cybersecurity object.

15. The system of claim 10, wherein the memory contains further instructions which when executed by the processing circuitry further configure the system to:
detect the forensic artifact in a log of the computing environment, the log including a plurality of data records, each data record corresponding to an event.

16. The system of claim 15, wherein the memory contains further instructions which when executed by the processing circuitry further configure the system to:
parse a data record of the plurality of data records; and
extract a value from a predetermined data field detected based on the parsed data record.

17. The system of claim 10, wherein the memory contains further instructions which when executed by the processing circuitry further configure the system to
traverse the security database to detect a representation of an entity of the computing environment; and generate the visualization further based on another representation connected to the representation of the entity.

* * * * *